US012658636B2

(12) United States Patent
Wi et al.

(10) Patent No.: US 12,658,636 B2
(45) Date of Patent: Jun. 16, 2026

(54) CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Nungna Wi, Mie (JP); Shinji Tanaka, Mie (JP); Tetsuya Miyamura, Mie (JP); Yasunori Asano, Mie (JP); Daisuke Saito, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 401 days.

(21) Appl. No.: 18/562,312

(22) PCT Filed: May 17, 2022

(86) PCT No.: PCT/JP2022/020498
§ 371 (c)(1),
(2) Date: Nov. 19, 2023

(87) PCT Pub. No.: WO2022/255087
PCT Pub. Date: Dec. 8, 2022

(65) Prior Publication Data
US 2024/0243519 A1 Jul. 18, 2024

(30) Foreign Application Priority Data
Jun. 2, 2021 (JP) ................................ 2021-092852

(51) Int. Cl.
*H01R 13/627* (2006.01)
*H01R 13/424* (2006.01)

(52) U.S. Cl.
CPC ......... *H01R 13/627* (2013.01); *H01R 13/424* (2013.01)

(58) Field of Classification Search
CPC ............................ H01R 13/627; H01R 13/424
(Continued)

(56) References Cited

U.S. PATENT DOCUMENTS 5,613,872 A * 3/1997 Fukuda .............. H01R 13/7032 439/489
5,647,762 A * 7/1997 Fukuda .............. H01R 13/7032 439/489
(Continued)

FOREIGN PATENT DOCUMENTS

JP H11-354210 A 12/1999
JP 2008-146912 A 6/2008
JP 2016-143537 A 8/2016

OTHER PUBLICATIONS

International Search Report issued on Jul. 12, 2022 for WO 2022/255087 A1 (4 pages).

*Primary Examiner* — Harshad C Patel
(74) *Attorney, Agent, or Firm* — Venjuris, P.C.

(57) ABSTRACT

A connector 10 is provided with a first connector housing and a second connector housing to be connected to the first connector housing along a connection direction. The first connector housing includes a resilient deforming portion 35 separate from the first connector housing and to be resiliently deformed along an outer surface of the first connector housing while being mounted on the first connector housing. The second connector housing includes a receptacle 13 to be externally fit to the first connector housing and a lock portion
(Continued)

15 provided inside the receptacle 13 and to be engaged with the resilient deforming portion 35.

5 Claims, 18 Drawing Sheets

(58) Field of Classification Search
USPC .......................................................... 439/345
See application file for complete search history.

(56) References Cited

U.S. PATENT DOCUMENTS

| | | | | | |
|---|---|---|---|---|---|
| 5,743,760 | A * | 4/1998 | Inaba | H01R 13/7031 439/489 |
| 6,257,922 | B1 * | 7/2001 | Shinozaki | H01R 13/7032 439/489 |
| 6,712,636 | B2 * | 3/2004 | Fukuda | H01R 13/6271 439/353 |
| 7,114,997 | B2 * | 10/2006 | Sagawa | H01R 13/4365 439/752 |
| 7,393,233 | B2 * | 7/2008 | Machida | H01R 13/4223 439/752 |
| 8,939,799 | B2 * | 1/2015 | Watanabe | H01R 13/6273 439/686 |
| 9,246,255 | B1 * | 1/2016 | Holthus | H01R 13/4365 |
| 9,300,089 | B2 * | 3/2016 | Hashimoto | H01R 13/641 |
| 2001/0029124 | A1 | 10/2001 | Hasegawa | |
| 2004/0106330 | A1 * | 6/2004 | Mase | H01R 13/506 439/695 |
| 2007/0072482 | A1 | 3/2007 | Fujii et al. | |
| 2012/0164866 | A1 * | 6/2012 | Suemitsu | H01R 13/4361 439/345 |
| 2015/0013157 | A1 * | 1/2015 | Kutsuna | H01R 13/4361 29/747 |
| 2016/0079705 | A1 * | 3/2016 | Horiuchi | H01R 13/639 439/345 |
| 2017/0222358 | A1 * | 8/2017 | Hashimoto | H01R 13/424 |
| 2018/0316128 | A1 * | 11/2018 | Gunreben | H01R 13/6272 |
| 2018/0337491 | A1 | 11/2018 | Miyamura et al. | |
| 2019/0199036 | A1 * | 6/2019 | Kanemura | H01R 13/50 |
| 2022/0271473 | A1 * | 8/2022 | Miyamura | H01R 13/6335 |
| 2023/0378692 | A1 * | 11/2023 | Matsuo | H01R 13/4362 |

* cited by examiner

CONNECTOR

CROSS REFERENCE TO RELATED APPLICATIONS

This application is a national phase of PCT application No. PCT/JP2022/020498, filed on 17 May 2022, which claims priority from Japanese patent application No. 2021-092852, filed on 2 Jun. 2021, all of which are incorporated herein by reference.

TECHNICAL FIELD

The present disclosure relates to a connector.

BACKGROUND

Conventionally, a connector provided with a lock arm is known from Japanese Patent Laid-Open Publication No. 2016-143537. This connector includes a first connector housing and a second connector housing connectable to each other along a connection direction. The first connector housing includes a receptacle to be externally fit to the second connector housing. The lock arm resiliently deformable in a height direction of the second connector housing is formed on the outer surface of the second connector housing. The lock arm is resiliently locked to an arm locking portion provided on the receptacle, whereby the first and second connector housings are connected in a retained state.

PRIOR ART DOCUMENT

Patent Document

Patent Document 1: JP 2016-143537 A

SUMMARY OF THE INVENTION

Problems to be Solved

According to the above configuration, since a space for resiliently deforming the lock arm is necessary, there is a problem that the connector is enlarged in the height direction of the second connector housing.

The present disclosure was completed on the basis of the above situation and aims to provide a technique for the size reduction of a connector.

Means to Solve the Problem

The present disclosure is directed to a connector with a first connector housing and a second connector housing to be connected to the first connector housing along a connection direction, the first connector housing including a resilient deforming portion separate from the first connector housing, the resilient deforming portion being resiliently deformed along an outer surface of the first connector housing while being mounted on the first connector housing, and the second connector housing including a receptacle to be externally fit to the first connector housing and a lock portion provided inside the receptacle and to be engaged with the resilient deforming portion.

Effect of the Invention

According to the present disclosure, a connector can be reduced in size.

DETAILED DESCRIPTION TO EXECUTE THE INVENTION

Description of Embodiments of Present Disclosure

Figure 1:
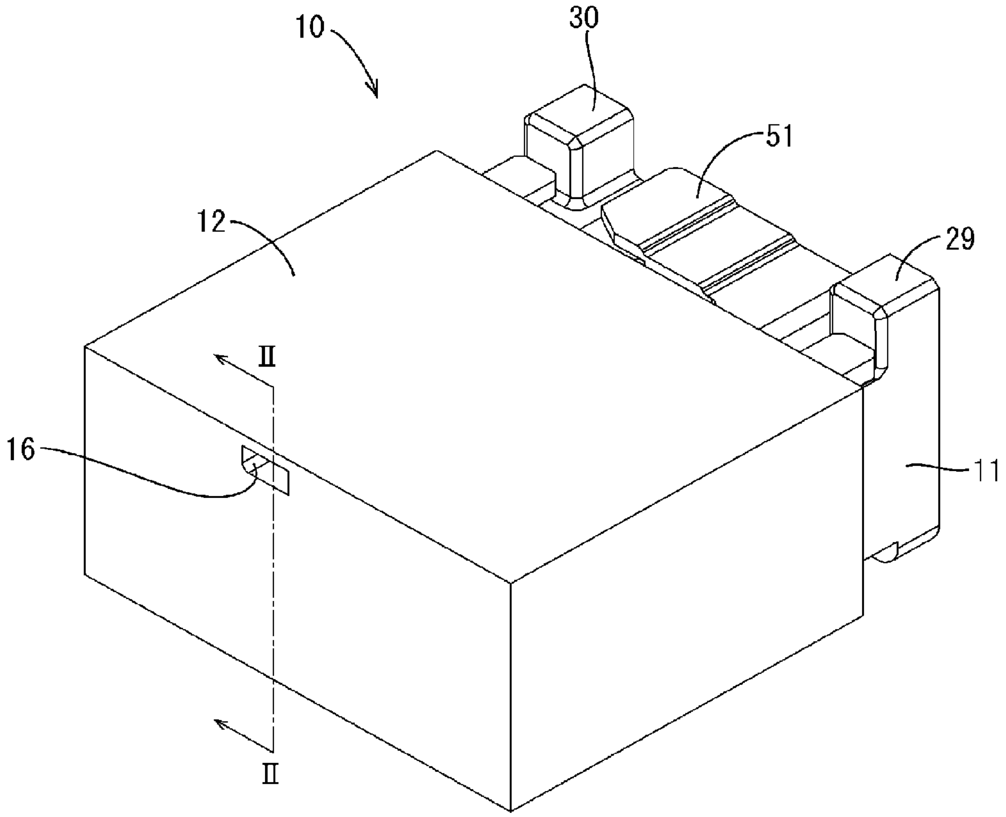
FIG. 1 is a perspective view showing a connector according to a first embodiment.

First, embodiments of the present disclosure are listed and described.

(1) The connector of the present disclosure is provided with a first connector housing and a second connector housing to be connected to the first connector housing along a connection direction, the first connector housing including a resilient deforming portion separate from the first connector housing, the resilient deforming portion being resiliently deformed along an outer surface of the first connector housing while being mounted on the first connector housing, and the second connector housing including a receptacle to be externally fit to the first connector housing and a lock portion provided inside the receptacle and to be engaged with the resilient deforming portion.

The resilient deforming portion is resiliently deformed along the outer surface of the first connector housing. As a result, the connector can be reduced in size in a height direction as compared to the case where a lock arm is resiliently deformed along a height direction of the first connector housing.

(2) Preferably, the first connector housing includes a terminal accommodating portion for accommodating a terminal and a retainer mounting portion communicating with the terminal accommodating portion, a retainer is mounted into the retainer mounting portion and engaged with the terminal while being mounted in the retainer mounting portion, and the retainer is provided with the resilient deforming portion. The resilient deforming portion can be provided in the first connector housing without increasing the number of components.

(3) Preferably, the resilient deforming portion includes at least one front arm portion extending forward in the connection direction, at least one rear arm portion extending rearward in the connection direction and at least one coupling portion coupling an end part of the front arm portion and an end part of the rear arm portion, and at least one of the front arm portion and the rear arm portion is provided with a lock receiving portion to be engaged with the lock portion.

The first connector housing and the second connector housing are retained in a connected state by the resilient engagement of the lock portion and the lock receiving portion.

(4) Preferably, a stress relieving portion thinner than other parts is provided near the lock receiving portion.

Since the stress relieving portion is thinner than the other parts of the resilient deforming portion, the stress relieving portion is more easily deformed than the other parts. Thus, if the first connector housing and the second connector housing receive forces in directions away from each other with the first connector housing and the second connector housing connected, a force applied to the lock receiving portion is also transmitted to the stress relieving portion provided near the lock receiving portion and the stress relieving portion is deformed. Since the force applied to the lock receiving portion is distributed in this way, the concentration of excessive stress on the lock receiving portion is suppressed. As a result, the deformation of the lock receiving portion is suppressed, wherefore a holding force between the lock portion of the first connector housing and the lock receiving portion of the second connector housing is improved when the first connector housing and the second connector housing receive forces in the directions away from each other.

(5) Preferably, an engaging portion projecting inwardly of the receptacle is provided inside the receptacle of the second connector housing, and an engaged portion projecting toward the second connector housing and to be engaged with the engaging portion of the second connector housing with the first connector housing and the second connector housing connected is provided on the outer surface of the first connector housing.

Since the engaging portion of the second connector housing and the engaged portion of the first connector housing are engaged with the first connector housing and the second connector housing connected, the receptacle is suppressed from being deformed to expand in a direction intersecting the connection direction.

(6) Preferably, a deflection restricting portion is provided which comes into contact with the resilient deforming portion when the resilient deforming portion receives a force in a direction away from the outer surface of the first connector housing.

The deflection restricting portion comes into contact with the resilient deforming portion when the resilient deforming portion receives the force in the direction away from the outer surface of the first connector housing, whereby the resilient deforming portion is suppressed from being deflected in the direction away from the outer surface of the first connector housing.

Details of Embodiment of Present Disclosure

Hereinafter, embodiments of the present disclosure are described. The present disclosure is not limited to these illustrations, but is represented by claims and intended to include all changes in the scope of claims and in the meaning and scope of equivalents.

First Embodiment

A first embodiment of the present disclosure is described with reference to FIGS. 1 to 9. As shown in FIG. 1, a connector 10 of the first embodiment is provided with a female connector housing 11 (an example of a first connector housing) and a male connector housing 12 (an example of a second connector housing) to be externally connected to the female connector housing 11. In the following description, a vertical direction is based on a vertical direction in FIG. 2, directions connected to each other based on a connection direction of the female connector housing 11 and the male connector housing 12 in FIG. 4 are defined as forward directions concerning a front-rear direction, a lateral direction toward the front based on the forward direction is defined as a lateral direction. Further, for a plurality of identical members, only some members may be denoted by a reference sign and the other members may not be denoted by the reference sign.

[Male Connector Housing 12]

Figure 2:
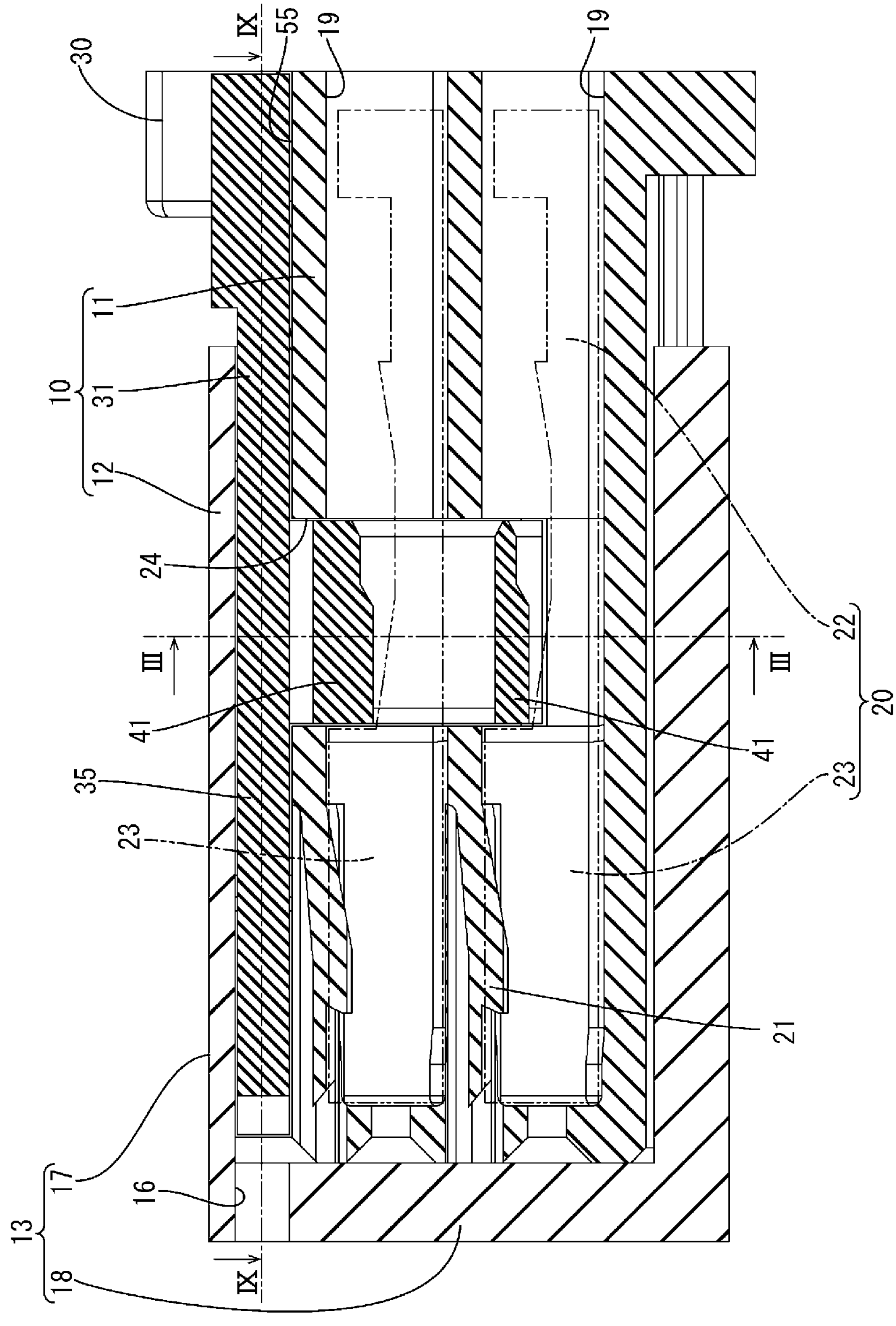
FIG. 2 is a section along II-II in FIG. 1.

The male connector housing 12 is formed by injection-molding an insulating synthetic resin. As shown in FIG. 2, the male connector housing 12 includes a receptacle 13 open forward. The male connector housing 12 is substantially in the form of a rectangular tube.

Figure 3:
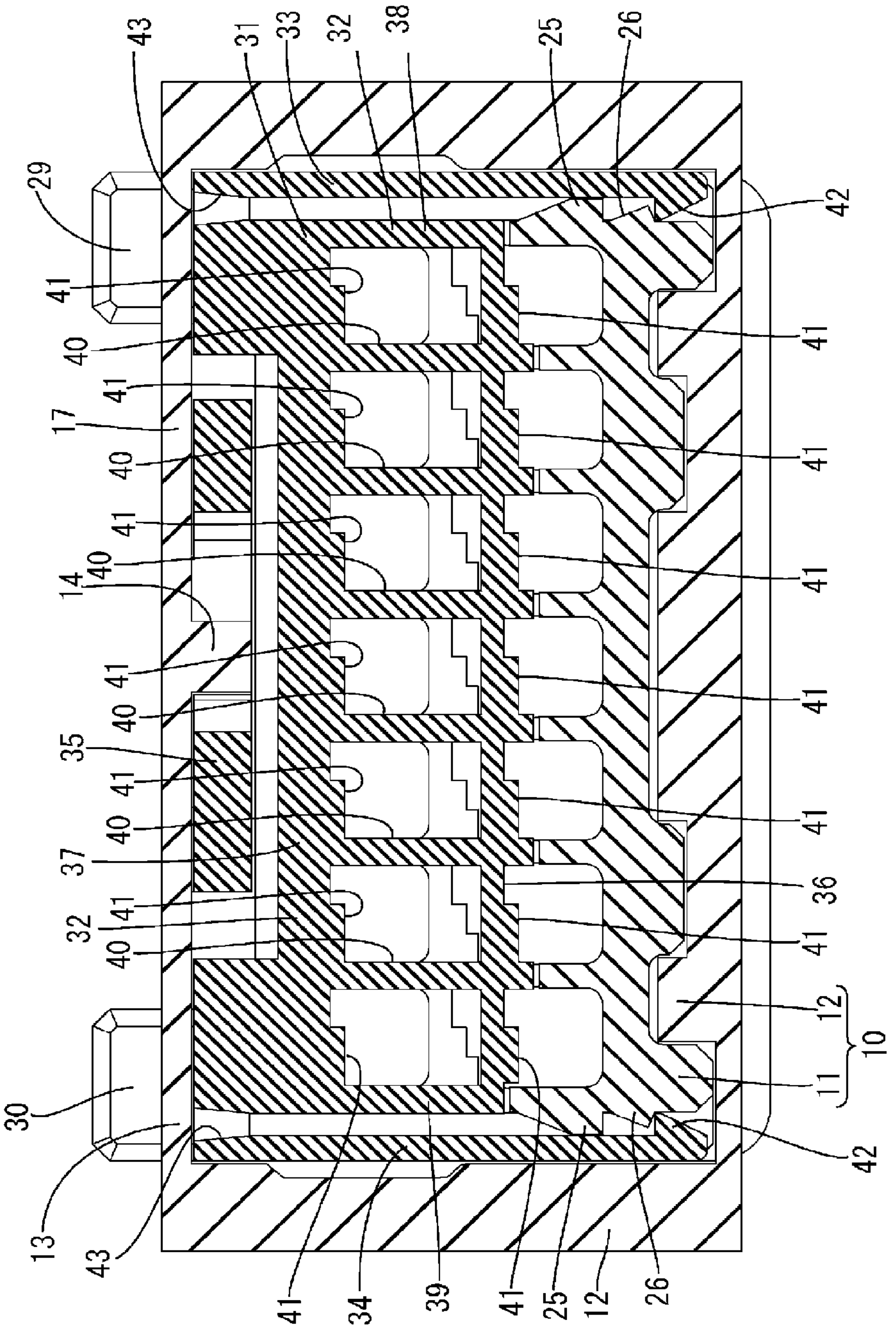
FIG. 3 is a section along III-III in FIG. 2.
Figure 4:
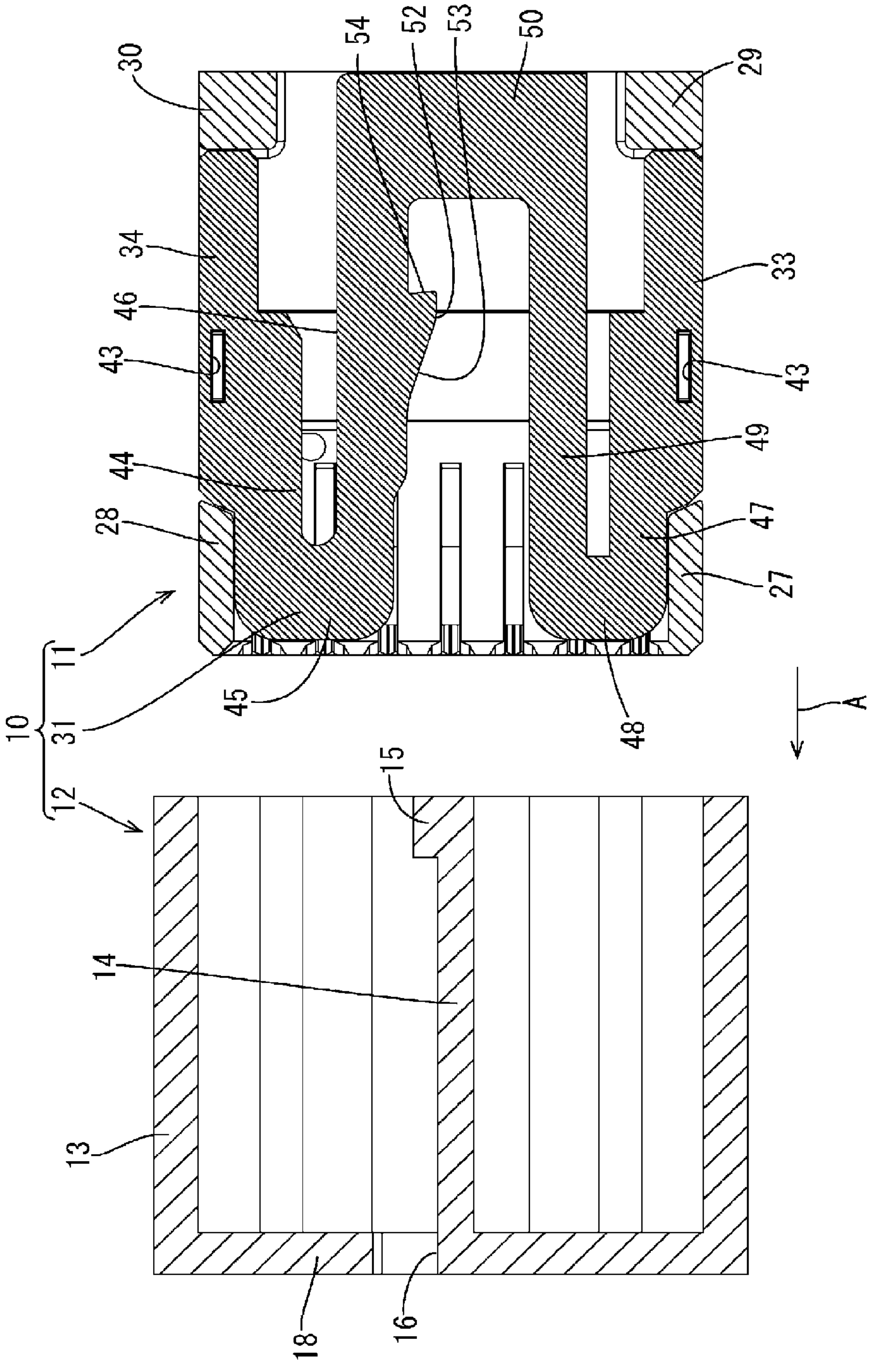
FIG. 4 is a section along IX-IX in FIG. 2 showing a state before a male connector housing and a female connector housing are connected.

As shown in FIG. 3, a rib 14 projecting downward and extending in the front-rear direction is formed at a substantially center position in the lateral direction on the lower surface of an upper wall 17 of the receptacle 13. As shown in FIG. 4, a lock portion 15 projecting leftward is formed on a front end part of the rib 14. A rear wall 18 of the receptacle 13 is formed with a mold removal hole 16 for forming the lock portion 15, the mold removal hole 16 penetrating through the rear wall 18 in the front-rear direction, at a position behind the lock portion 15. Unillustrated male terminals are disposed through the rear wall 18 of the male connector housing 12.

[Female Connector Housing 11]

Figure 5:
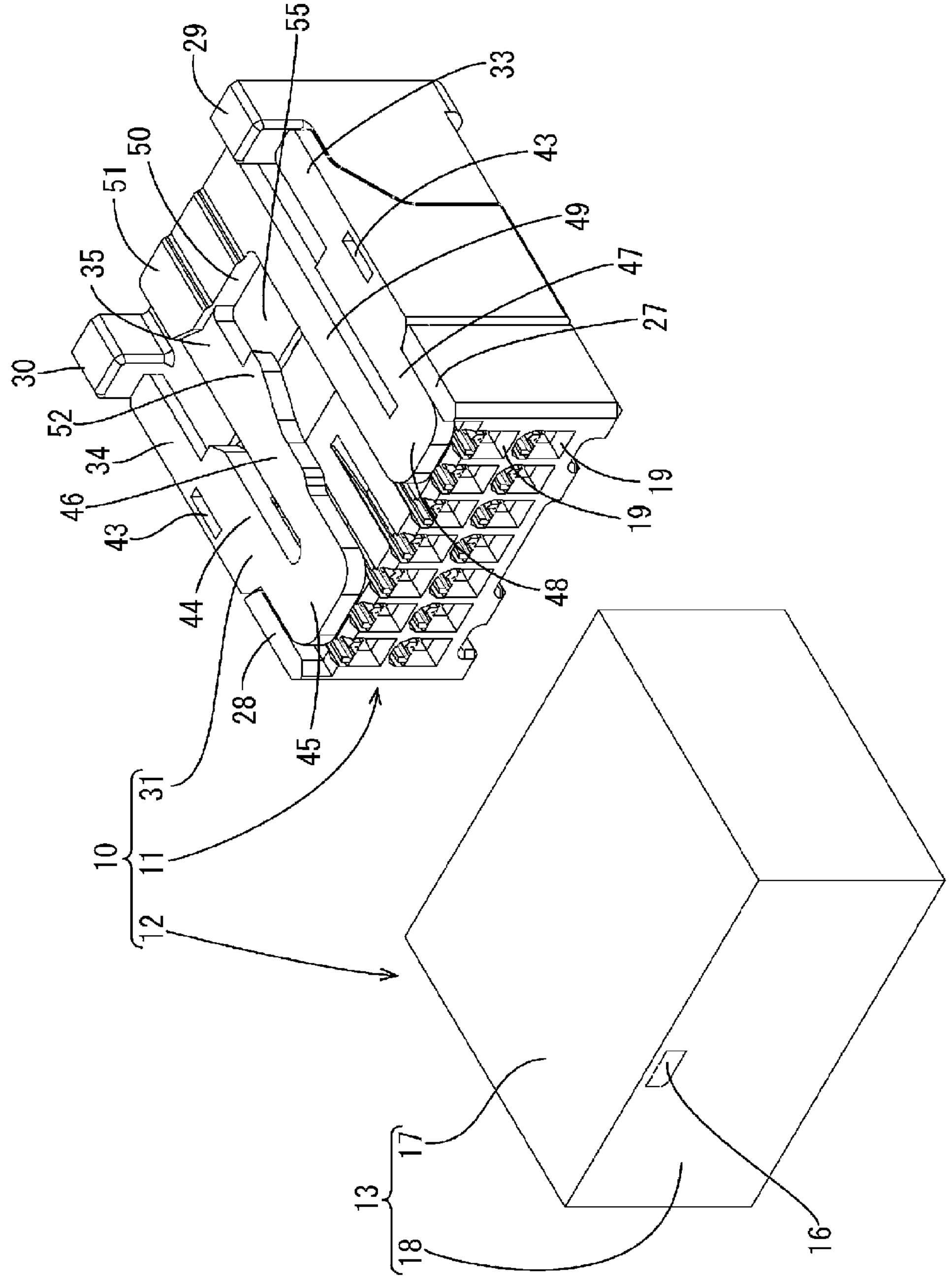
FIG. 5 is a perspective view showing the state where the male connector housing and the female connector housing are connected.

As shown in FIG. 5, the female connector housing 11 is made of insulating synthetic resin and has a rectangular parallelepiped shape as a whole. The female connector housing 11 includes a plurality of terminal accommodating portions 19. In the first embodiment, seven terminal accommodating portions 19 are arranged in the lateral direction in each of two upper and lower stages. Each of the plurality of terminal accommodating portions 19 is a space penetrating through the female connector housing 11 in the front-rear direction. A female terminal 20 is inserted into each terminal accommodating portion 19 from behind. A locking lance 21 obliquely extending to a lower-front side is formed on the upper surface of the terminal accommodating portion 19 (see FIG. 2).

As shown in FIG. 2, the female terminal 20 is formed by press-working a metal plate material made of copper, copper alloy or the like into a predetermined shape. The female terminal 20 includes a wire connecting portion 22 to be connected to a wire (not shown) and a connecting tube portion 23 formed in front of the wire connecting portion 22. The wire connecting portion 22 is electrically connected to the wire by being crimped to the outer periphery of the wire. The connecting tube portion 23 is in the form of a rectangular tube open forward. The female terminal 20 is held in a retained state in the terminal accommodating portion 19 by locking a front end part of the locking lance 21 to the upper wall of the connecting tube portion 23 from behind. One female terminal 20 is accommodated inside one terminal accommodating portion 19.

Figure 6:
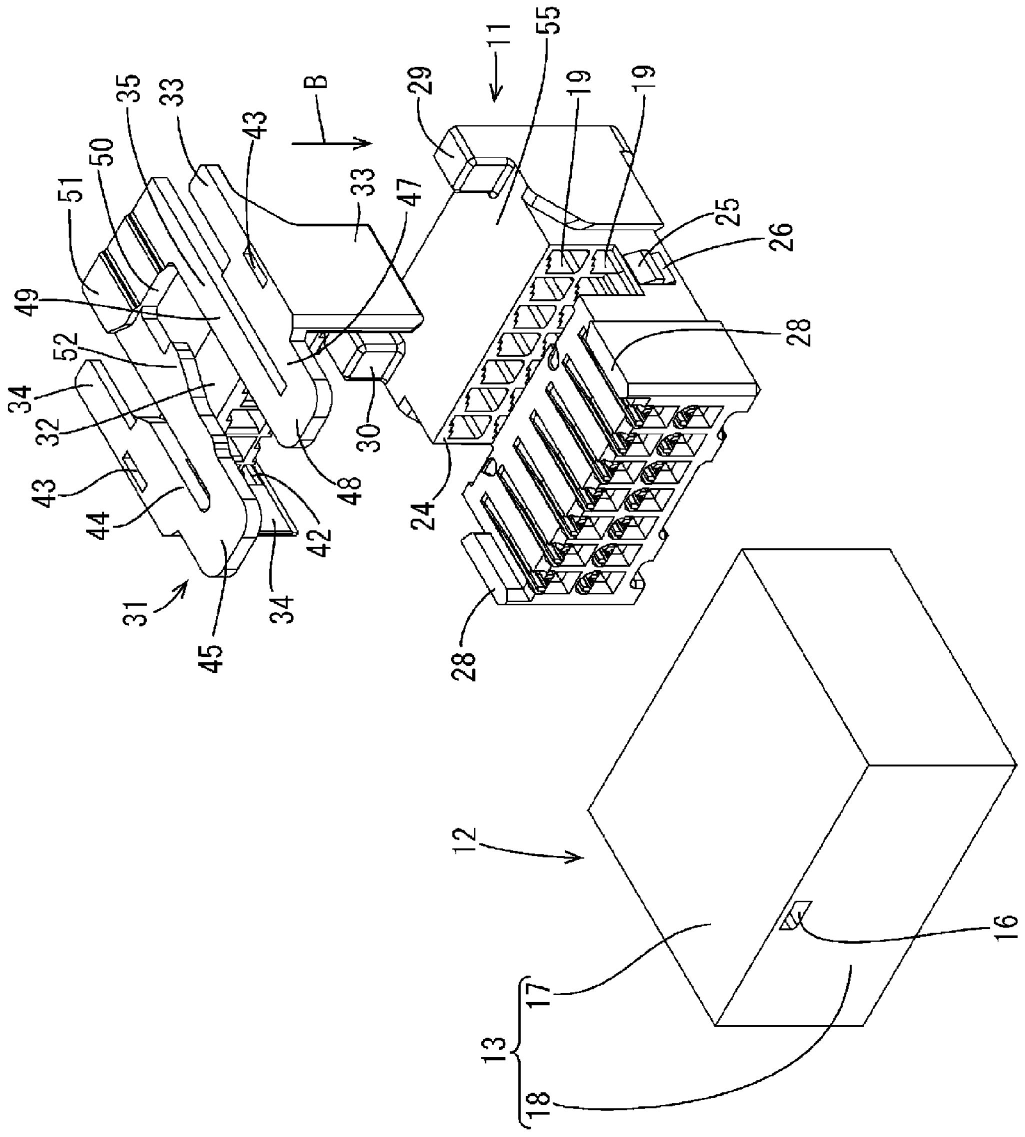
FIG. 6 is an exploded perspective view showing the connector.

As shown in FIG. 6, a retainer mounting portion 24 recessed downward is formed at a substantially center position in the front-rear direction in an upper surface 55 (an example of an outer surface) of the female connector housing 11. The retainer mounting portion 24 is formed to be recessed by a distance, which is substantially about two-thirds of a height of the female connector housing 11, from the upper surface 55 of the female connector housing 11 in a height direction. The retainer mounting portion 24 communicates with the terminal accommodating portions 19 in the upper stage and the terminal accommodating portions 19 in the lower stage formed in the female connector housing 11.

As shown in FIG. 3, temporary locking portions 25 and complete locking portions 26 are formed to project outward in the lateral direction at positions below the retainer mounting portion 24 on left and right side surfaces of the female connector housing 11. The complete locking portions 26 are formed below the temporary locking portions 25.

As shown in FIG. 6, a left-front protrusion 27, a right-front protrusion 28, a left-rear protrusion 29 and a right-rear protrusion 30 projecting upward are formed on four corner parts of the female connector housing 11 on the upper surface 55 of the female connector housing 11 when viewed from above.

The left-front protrusion 27 is formed on the left-front corner part of the female connector housing 11 and in the form of a rib extending in the front-rear direction. The right-front protrusion 28 is formed on the right-front corner part of the female connector housing 11 and in the form of a rib extending in the front-rear direction. Lengths in the front-rear direction of the left-front and right-front protrusions 27, 28 are set to be equal.

The left-rear protrusion 29 is formed on the left-rear corner part of the female connector housing 11 and in the form of a column rectangular when viewed from above. The right-rear protrusion 30 is formed on the right-rear corner part of the female connector housing 11 and in the form of a column rectangular when viewed from above.

[Retainer 31]

The retainer 31 is formed by injection-molding an insulating synthetic resin. As shown in FIG. 6, the retainer 31 is a so-called side retainer to be mounted into the retainer mounting portion 24 of the female connector housing 11 from above along a direction indicated by an arrow B. The retainer 31 is relatively displaceable with respect to the female connector housing 11 between a temporary locking position for allowing the insertion and withdrawal of the female terminals 20 into and from the terminal accommodating portions 19 and a complete locking position for restricting the insertion and withdrawal of the female terminals 20.

As shown in FIG. 6, the retainer 31 includes a body portion 32 extending in the lateral direction, a left side wall 33 located to the left of the body portion 32, a right side wall 34 located to the right of the body portion 32 and a resiliently deformable resilient deforming portion 35 coupling an upper end part of the left side wall 33 and that of the right side wall 34.

As shown in FIG. 3, the body portion 32 has a substantially rectangular parallelepiped shape extending in the lateral direction. The body portion 32 includes a lower wall 36 located on a lower side and an upper wall 37 located above the lower wall 36. A left end part of the upper wall 37 and that of the lower wall 36 are coupled by a left side wall 38. A right end part of the upper wall 37 and that of the lower wall 36 are coupled by a right side wall 39. A space between the left side wall 38 and the right side wall 39 is partitioned by a plurality of (six in this embodiment) separation walls 40. The female terminals 20 accommodated into the terminal accommodating portions 19 in the upper stage formed in the female connector housing 11 can be inserted through spaces partitioned by the left side wall 38, the six separation walls 40 and the right side wall 39.

As shown in FIG. 3, terminal contact portions 41 projecting downward are formed on the lower surface of the lower wall 36. Terminal contact portions 41 projecting downward are also formed on the lower surface of the upper wall 37. With the retainer 31 held at the complete locking position with respect to the female connector housing 11, the terminal contact portions 41 are in contact with rear end parts of the connecting tube portions 23 of the female terminals 20 accommodated in the terminal accommodating portions 19 from behind. In this way, the female terminals 20 are doubly locked by the locking lances 21 and the retainer 31.

As shown in FIG. 3, locking claws 42 are formed on a lower end part of the left side wall 33 and that of the right side wall 34 of the retainer 31. The locking claws 42 come into contact with the complete locking portions 26 or temporary locking portions 25 of the female connector housing 11 from below, whereby the retainer 31 is held in the female connector housing 11 while being prevented from coming out upward. The left side wall 33 and the right side wall 34 of the retainer 31 are formed with mold removal holes 43 for forming the locking claws 42 above the locking claws 42.

[Resilient Deforming Portion 35]

Figure 7:
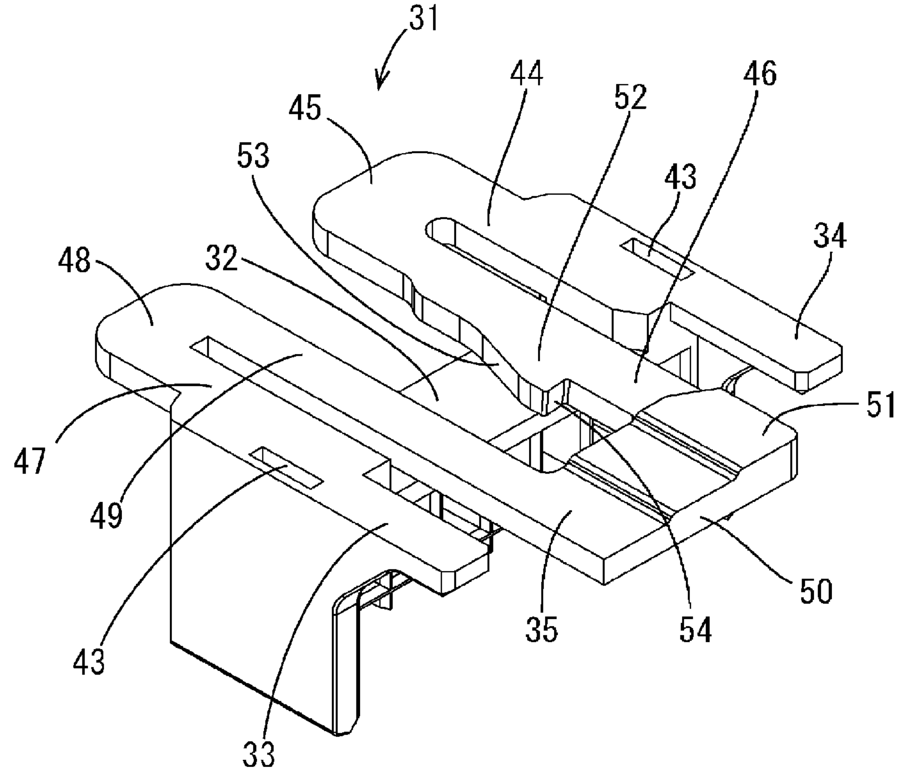
FIG. 7 is a perspective view showing a retainer.

As shown in FIG. 5, the resilient deforming portion 35 is formed to be resiliently deformable in the lateral direction along the upper surface of the female connector housing 11. As shown in FIG. 7, the resilient deforming portion 35 includes a right-front arm portion 44 extending forward from an upper end part of the right side wall 34, a right coupling portion 45 extending leftward from a front end part of the right-front arm portion 44, a right-rear arm portion 46 extending rearward from a left end part of the right coupling portion 45, a left-front arm portion 47 extending forward from an upper end part of the left side wall 33, a left coupling portion 48 extending rightward from a front end part of the left-front arm portion 47, a left-rear arm portion 49 extending rearward from a right end part of the left coupling portion 48 and a rear coupling portion 50 coupling a rear end part of the right-rear arm portion 46 and that of the left-rear arm portion 49.

As shown in FIG. 4, lengths in the front-rear direction of the right-rear arm portion 46 and the left-rear arm portion 49 are set to be substantially equal to that of the female connector housing 11. Substantially equal means a case where the lengths in the front-rear direction of the right-rear arm portion 46 and the left-rear arm portion 49 are equal to that of the female connector housing 11 and also a case where these lengths can be identified to be substantially equal even if these lengths are not equal.

The right coupling portion 45 is formed to be deflectable and deformable. In this way, the right-front arm portion 44 and the right-rear arm portion 46 can move toward and away from each other in the lateral direction. Further, the left coupling portion 48 is formed to be deflectable and deformable. In this way, the left-front arm portion 47 and the left-rear arm portion 49 can move toward and away from each other in the lateral direction.

As shown in FIG. 7, the rear coupling portion 50 is in the form of a plate flat in the vertical direction. A finger hooking portion 51 raised in a stepwise manner from the left side toward the right side is formed on the upper surface of the rear coupling portion 50. By this step shape, a worker easily hooks a finger on the rear coupling portion 50.

As shown in FIG. 4, a lock receiving portion 52 projecting leftward is provided near a center position in the front-rear direction on the left side surface of the right-rear arm portion 46. The front surface of the lock receiving portion 52 is formed with an inclined surface 53 to be narrowed toward the front. The rear surface of the lock receiving portion 52 is formed into a locking surface 54 formed to be upright with respect to the left side surface of the right-rear arm portion 46. The lock portion 15 comes into contact with the locking surface 54 of the lock receiving portion 52 from behind.

As shown in FIG. 5, with the retainer 31 held at the complete locking position with respect to the female connector housing 11, the upper surface of the resilient deforming portion 35 of the retainer 31 is formed to be substantially flush with that of the left-front protrusion 27 and that of the right-front protrusion 28. Substantially flush means a case where the upper surface of the resilient deforming portion 35, that of the left-front protrusion 27 and that of the right-front protrusion 28 are flush with each other and also a case where these upper surfaces can be identified to be substantially flush with each other even if these upper surfaces are not flush with each other.

As shown in FIG. 5, with the retainer 31 held at the complete locking position with respect to the female connector housing 11, an upper end part of the left-rear protrusion 29 and an upper end part of the right-rear protrusion 30 of the female connector housing 11 are located higher than the upper surface of the resilient deforming portion 35. In this way, the contact of the finger hooking portion 51 of the resilient deforming portion 35 and external matters is suppressed.

[Assembling Process of Connector 10]

Next, an assembling process of the connector 10 according to this embodiment is described. As indicated by the arrow B in FIG. 6, the retainer 31 is mounted into the retainer mounting portion 24 of the female connector housing 11 from above. The locking claws 42 of the retainer mounting portion 24 come into contact with the temporary locking portions 25 of the female connector housing 11 from above. If the retainer 31 is pushed further downward, the locking claws 42 ride on the temporary locking portions 25, whereby the left side wall 33 and the right side wall 34 of the retainer 31 are resiliently deformed. If the retainer 31 is pushed further downward, the left side wall 33 and the right side wall 34 of the retainer 31 are restored and the locking claws 42 of the retainer 31 come into contact with the temporary locking portions 25 of the female connector housing 11 from below. In this way, the retainer 31 is held at the temporary locking position with respect to the female connector housing 11 while being prevented from coming out upward.

The female terminal 20 is accommodated into the terminal accommodating portions 19 of the female connector housing 11 from behind. The locking lance 21 locks the upper wall of the connecting tube portion 23 of the female terminal 20 from behind, whereby the female terminal 20 is held in the terminal accommodating portion 19 while being prevented from coming out rearward.

The retainer 31 is pressed downward. Then, the locking claws 42 ride on the complete locking portions 26, whereby the left side wall 33 and the right side wall 34 of the retainer 31 are resiliently deformed. If the retainer 31 is pushed further downward, the left side wall 33 and the right side wall 34 of the retainer 31 are restored and the locking claws 42 of the retainer 31 come into contact with the complete locking portions 26 of the female connector housing 11 from below. In this way, the retainer 31 is held at the complete locking position with respect to the female connector housing 11 while being prevented from coming out upward (see FIG. 3).

As shown in FIG. 2, with the retainer 31 held at the complete locking position with respect to the female connector housing 11, the terminal contact portions 41 of the retainer 31 are in contact with the rear end parts of the connecting tube portions 23 from behind. In this way, the female terminals 20 are held while being prevented from coming out rearward by the retainer 31. As a result, the female terminals 20 are doubly locked in the female connector housing 11 by the locking lances 21 and the retainer 31.

Figure 8:
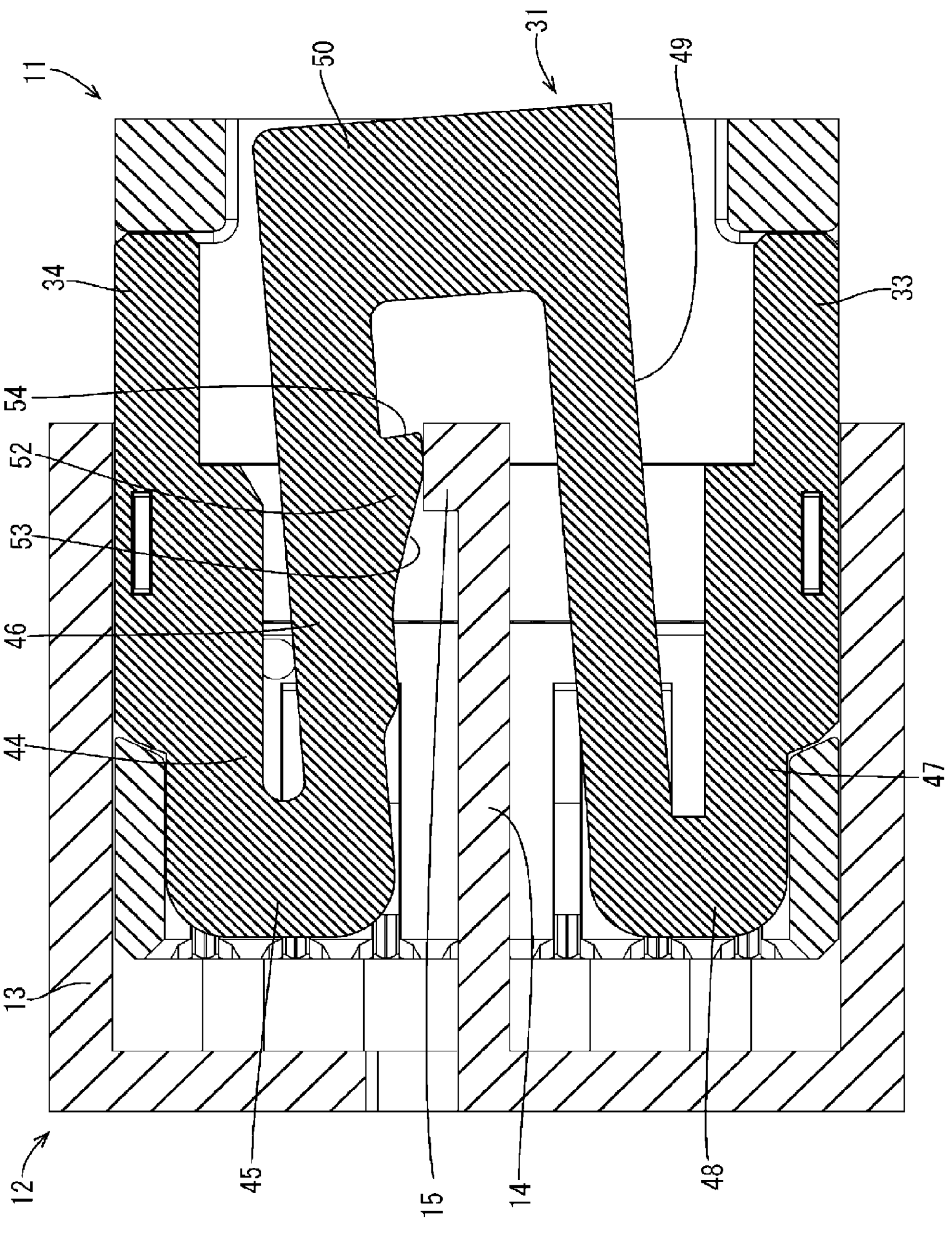
FIG. 8 is a section along IX-IX in FIG. 2 showing an intermediate state of a connection process of the male connector housing and the female connector housing.
Figure 9:
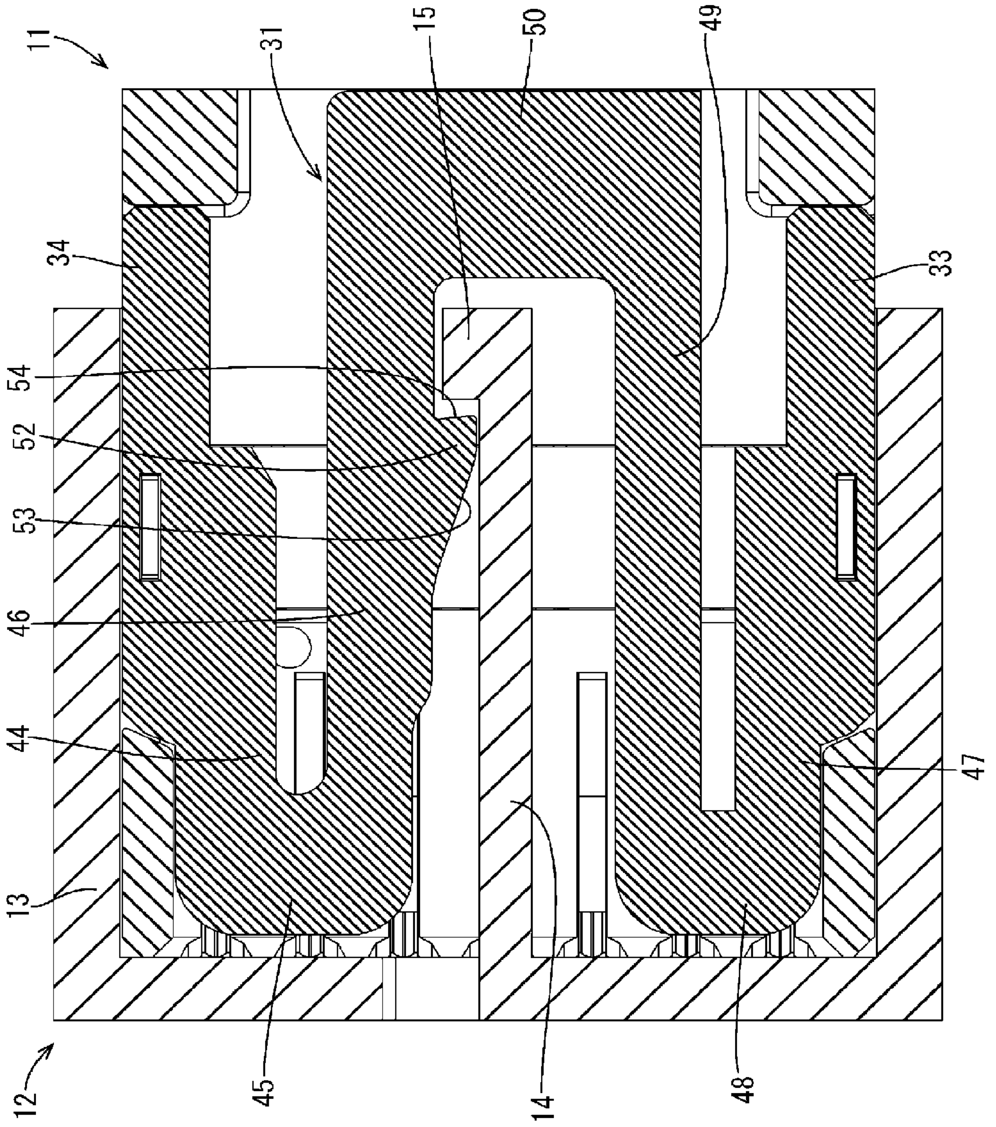
FIG. 9 is a section along IX-IX in FIG. 2.

As indicated by an arrow A of FIG. 4, the female connector housing 11 and the male connector housing 12 are brought closer to each other. The male connector housing 12 is externally connected to the female connector housing 11. The lock receiving portion 52 of the retainer 31 mounted in the female connector housing 11 comes into contact with the lock portion 15 provided in the male connector housing 12. Then, as shown in FIG. 8, the resilient deforming portion 35 of the retainer 31 mounted in the female connector housing 11 is resiliently deformed in the lateral direction. In particular, the right-front arm portion 44 and the right-rear arm portion 46 are resiliently deformed in directions toward each other, and the left-front arm portion 47 and the left-rear arm portion 49 are resiliently deformed in directions away from each other.

If the female connector housing 11 and the male connector housing 12 are brought even closer to each other, the resilient deforming portion 35 is restored. In this way, the lock receiving portion 52 of the retainer 31 mounted in the female connector housing 11 is locked to the lock portion 15 provided in the male connector housing 12 from front. In this way, the female connector housing 11 and the male connector housing 12 are held in a state retained each other (see FIG. 9).

Next, a procedure of releasing a connected state of the connector 10 is described. The finger hooking portion 51 is pressed rightward by the worker. Then, the resilient deforming portion 35 is resiliently deformed. In particular, the right-front arm portion 44 and the right-rear arm portion 46 are resiliently deformed in the directions toward each other, and the left-front arm portion 47 and the left-rear arm portion 49 are resiliently deformed in the directions away from each other. Then, the lock receiving portion 52 of the retainer 31 mounted in the female connector housing 11 is disengaged from the lock portion 15 provided in the male connector housing 12. If the female connector housing 11 is pulled rearward by the worker, the female connector housing 11 is separated from the inside of the receptacle 13 of the male connector housing 12. In this way, the connected state of the connector 10 is released.

[Functions and Effects of Embodiment]

Next, functions and effects of the first embodiment are described. The connector 10 according to this embodiment is provided with the female connector housing 11 and the male connector housing 12 to be connected to the female connector housing 11 along the connection direction, the female connector housing 11 includes the resilient deforming portion 35 separate from the female connector housing 11 and to be resiliently deformed along the outer surface of the female connector housing 11 while being mounted in the female connector housing 11, and the male connector housing 12 includes the receptacle 13 to be externally fit to the female connector housing 11 and the lock portion 15 provided inside the receptacle 13 and to be engaged with the resilient deforming portion 35.

The resilient deforming portion 35 is resiliently deformed along the outer surface of the female connector housing 11. As a result, the connector 10 can be reduced in size in the height direction as compared to the case where a lock arm is resiliently deformed along the height direction of the female connector housing 11.

Further, according to this embodiment, the female connector housing 11 includes the terminal accommodating portions 19 for accommodating the female terminals 20 and the retainer mounting portion 24 communicating with the terminal accommodating portions 19, the retainer 31 is mounted into the retainer mounting portion 24, the retainer 31 is engaged with the female terminals 20 while being mounted in the retainer mounting portion 24, and the retainer 31 is provided with the resilient deforming portion 35. According to the above configuration, the resilient deforming portion 35 can be provided in the female connector housing 11 without increasing the number of components.

Further, according to this embodiment, the resilient deforming portion 35 includes the right-front arm portion 44 extending forward, the right coupling portion 45 extending leftward from the front end part of the right-front arm portion 44, the right-rear arm portion 46 extending rearward from the left end part of the right coupling portion 45, the left-front arm portion 47 extending forward, the left coupling portion 48 extending rightward from the front end part of the left-front arm portion 47, the left-rear arm portion 49 extending rearward from the right end part of the left coupling portion 48 and the rear coupling portion 50 coupling the rear end part of the right-rear arm portion 46 and that of the left-rear arm portion 49, and the right-rear arm portion 46 is provided with the lock receiving portion 52 to be engaged with the lock portion 15.

By the resilient engagement of the lock portion 15 and the lock receiving portion 52, the female connector housing 11 and the male connector housing 12 are retained in the connected state.

Second Embodiment

Figure 10:
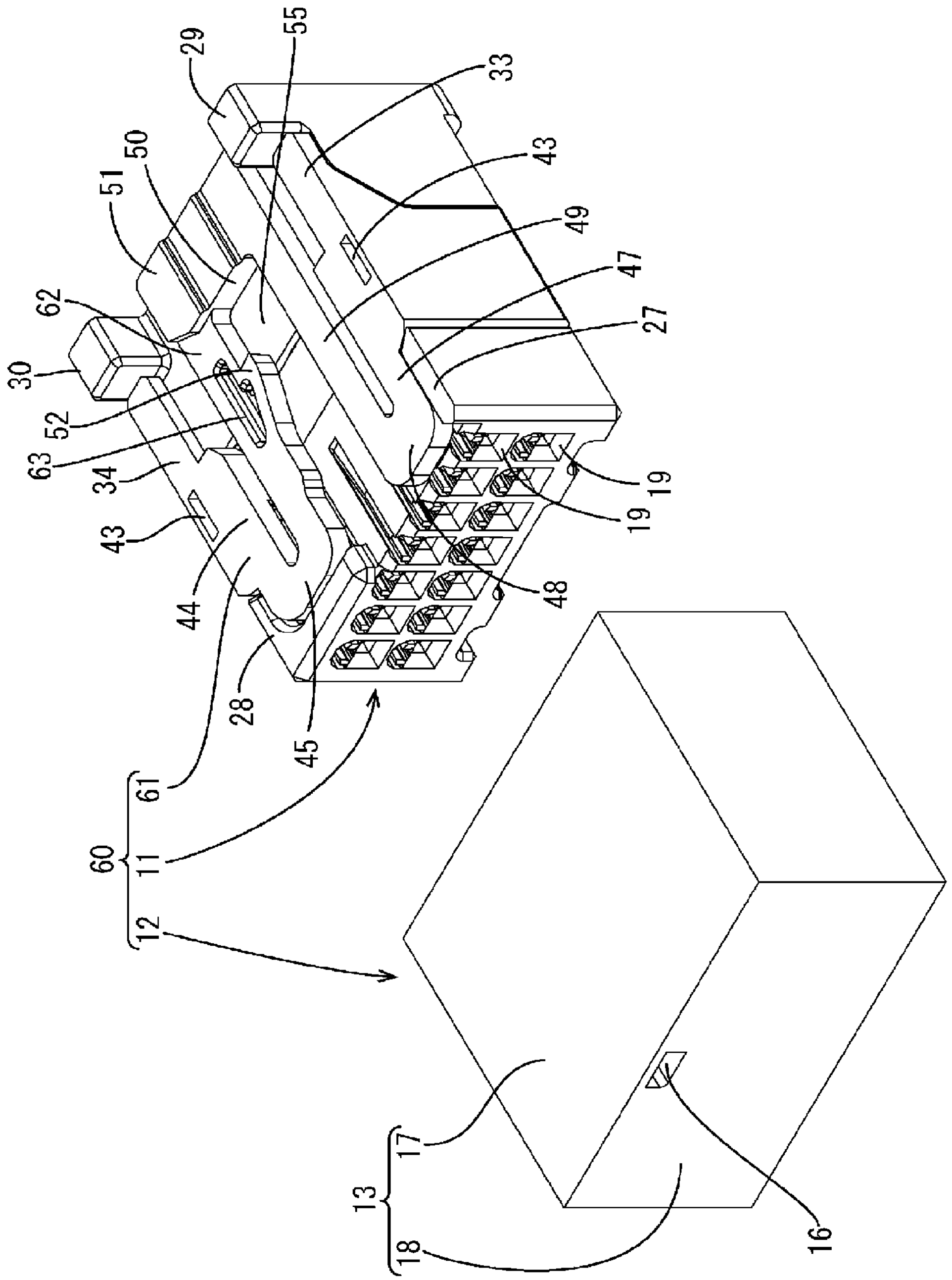
FIG. 10 is a perspective view showing a state before a male connector housing and a female connector housing are connected in a connector according to a second embodiment.

Next, a second embodiment of the present disclosure is described with reference to FIGS. 10 to 12. As shown in FIG. 10, in a connector 60 according to this embodiment, a resilient deforming portion 62 provided in a retainer 61 mounted in a female connector housing 11 includes a stress relieving portion 63. A right-front protrusion 28 provided on the female connector housing 11 has an L shape extending in the front-rear direction and lateral direction when viewed from above.

As shown in FIG. 10, the stress relieving portion 63 recessed downward is formed at a position near a lock receiving portion 52 and to the right of the lock receiving portion 52 on the upper surface of a right-rear arm portion 46 of the resilient deforming portion 62. The stress relieving portion 63 is a bottomed hole open upward. In a region where the stress relieving portion 63 is formed, the right-rear arm portion 46 of the resilient deforming portion 62 is thinner than other parts in the vertical direction.

Figure 11:
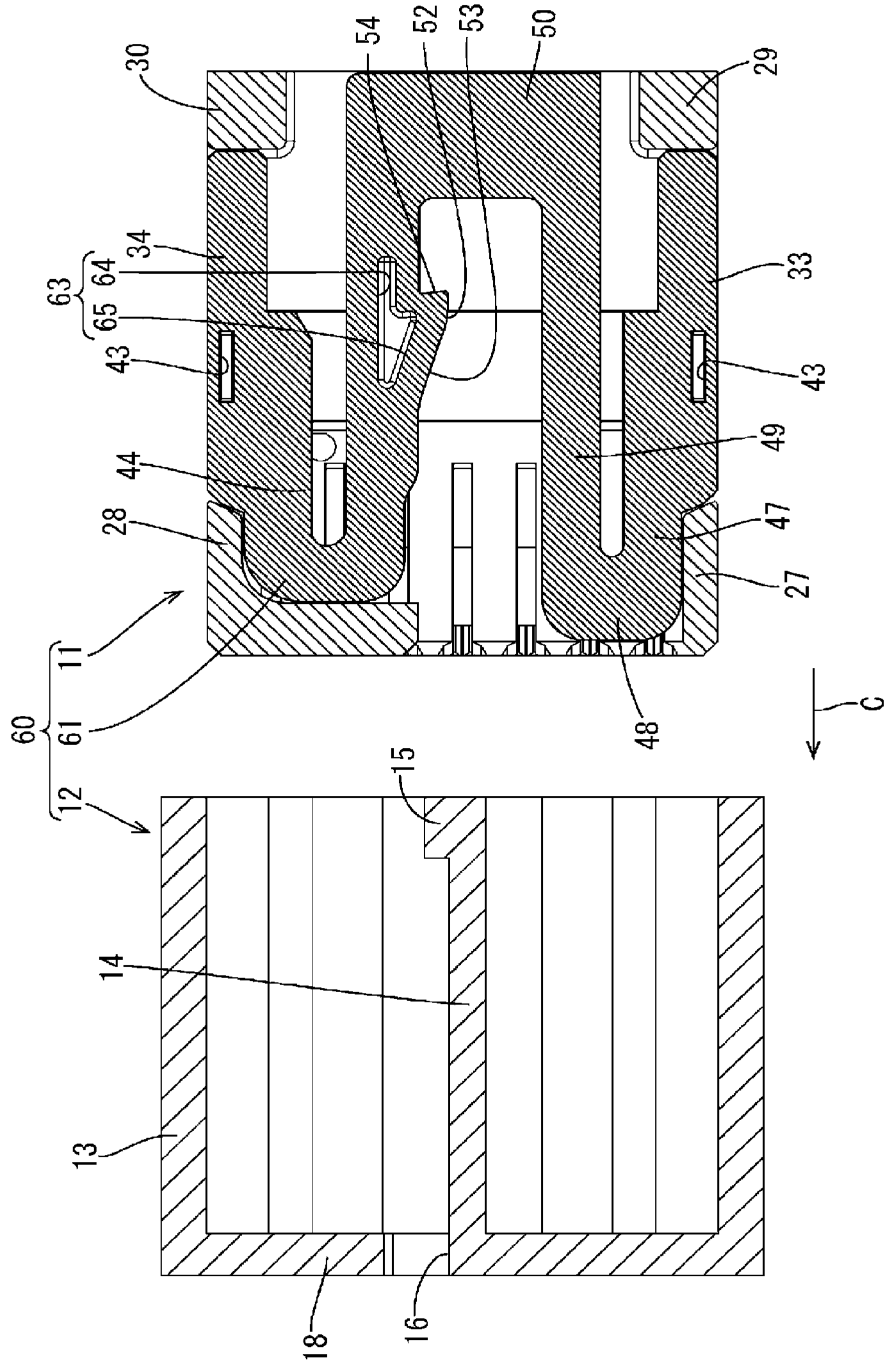
FIG. 11 is a section along IX-IX in FIG. 2 showing the state before the male connector housing and the female connector housing are connected.
Figure 12:
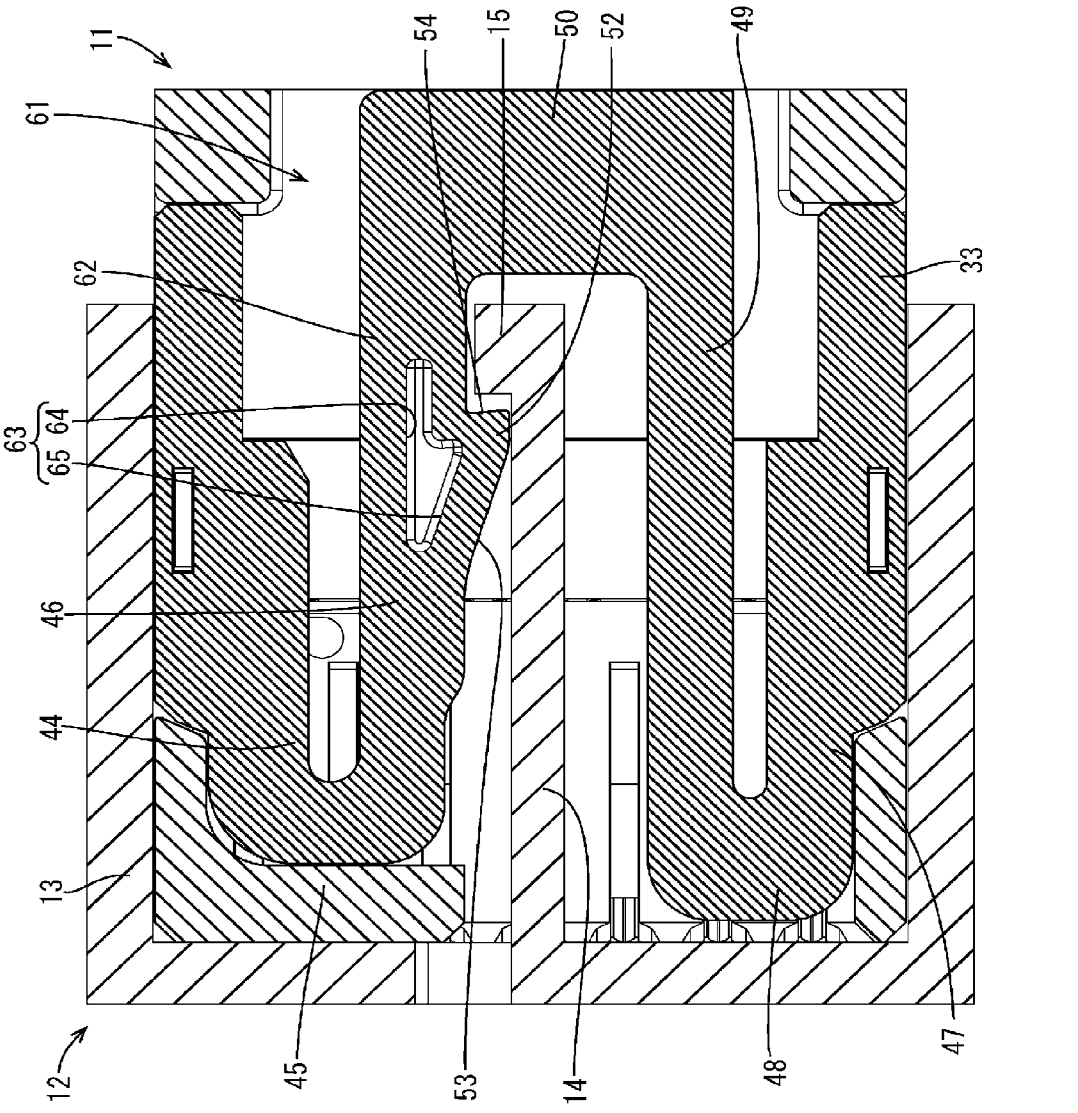
FIG. 12 is a section along IX-IX in FIG. 2 showing a state where the male connector housing and the female connector housing are connected.

As shown in FIG. 11, the stress relieving portion 63 includes a body portion 64 elongated in the front-rear direction and a projecting portion 65 projecting leftward from a front end part of the body portion 64 toward a rear side in a substantially half region of the body portion 64. The body portion 64 is formed to extend somewhat further rearward that a rear end part of the lock receiving portion 52.

As shown in FIG. 11, the projecting portion 65 has a triangular shape when viewed from above. The projecting portion 65 is formed to be narrower toward a front side. The projecting portion 65 has a shape similar to that of the lock receiving portion 52 and is formed to be smaller than the lock receiving portion 52.

Since the other configuration is substantially the same as in the first embodiment, the same members are denoted by the same reference signs and repeated description is omitted.

Next, functions and effects of the second embodiment are described. As shown in FIG. 11, the female connector housing 11 and a male connector housing 12 are brought closer to each other along a direction indicated by an arrow C. The male connector housing 12 is externally connected to the female connector housing 11. The lock receiving portion 52 of the retainer 61 mounted in the female connector housing 11 comes into contact with a lock portion 15 provided in the male connector housing 12. Then, the resilient deforming portion 62 of the retainer 61 mounted in the female connector housing 11 is resiliently deformed in the lateral direction. In particular, a right-front arm portion 44 and the right-rear arm portion 46 are resiliently deformed in directions toward each other, and a left-front arm portion 47 and a left-rear arm portion 49 are resiliently deformed in directions away from each other.

If the female connector housing 11 and the male connector housing 12 are brought even closer to each other, the resilient deforming portion 62 is restored. Further, an opening edge part of the stress relieving portion 63 is restored. In this way, the lock receiving portion 52 of the retainer 61 mounted in the female connector housing 11 is locked to the lock portion 15 provided in the male connector housing 12 from front. In this way, the female connector housing 11 and the male connector housing 12 are held in a state retained each other (see FIG. 12).

The resilient deforming portion 62 according to this embodiment is provided with the stress relieving portion 63 thinner than the other parts near the lock receiving portion 52. Since the stress relieving portion 63 is thinner than the other parts of the resilient deforming portion 62, the stress relieving portion 63 is more easily deformed than the other parts. Thus, if the female connector housing 11 and the male connector housing 12 receive forces in directions away from each other with the female connector housing 11 and the male connector housing 12 connected, a forward force is applied to the lock receiving portion 52 from the lock portion 15. The force applied to the lock receiving portion 52 is also transmitted to the stress relieving portion 63 provided near the lock receiving portion 52 and the stress relieving portion 63 is deformed. If the force is applied to the stress relieving portion 63, the opening edge part of the stress relieving portion 63 is deformed to fall down inside the stress relieving portion 63. In this way, stress applied to the lock receiving portion 52 is relieved.

Since the force applied to the lock receiving portion 52 is distributed as described above, the concentration of excessive stress on the lock receiving portion 52 is suppressed. As a result, the deformation of the lock receiving portion 52 is suppressed, wherefore a holding force between the lock receiving portion 52 of the female connector housing 11 and the lock portion 15 of the male connector housing 12 is improved when the female connector housing 11 and the male connector housing 12 receive forces in directions away from each other.

Third Embodiment

Figure 13:
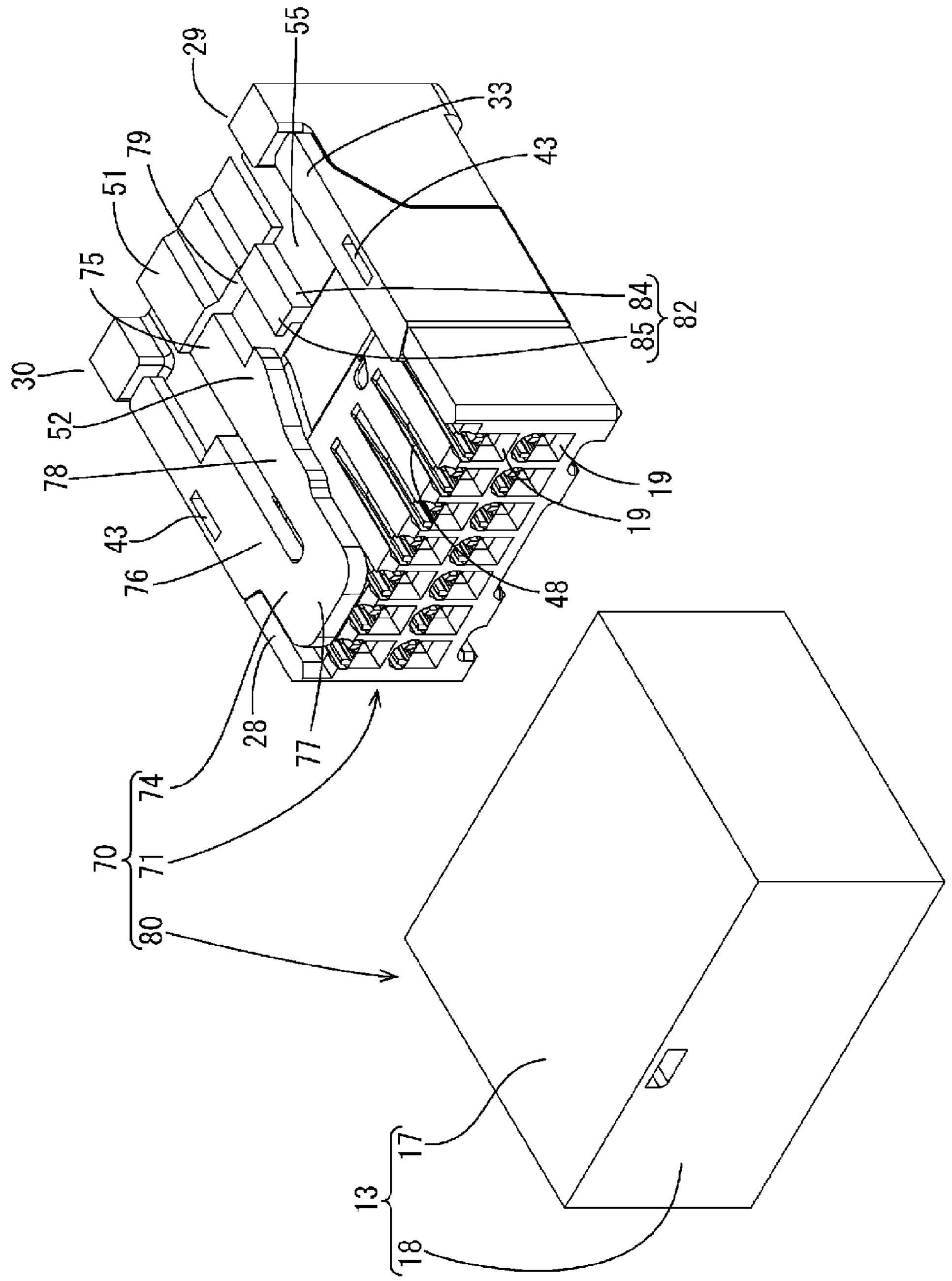
FIG. 13 is a perspective view showing a state before a male connector housing and a female connector housing are connected in a connector according to third embodiment.

Next, a connector 70 according to a third embodiment of the present disclosure is described with reference to FIGS. 13 to 16. As shown in FIG. 13, a resilient deforming portion 75 provided in a retainer 74 mounted in a female connector housing 71 according to this embodiment includes a front arm portion 76 extending forward from an upper end part of a right side wall 34 of the retainer 74, a coupling portion 77 extending leftward from a front end part of the front arm portion 76 and a rear arm portion 78 extending rearward from a left end part of the coupling portion 77. An extending portion 79 extending leftward is formed on a rear end part of the rear arm portion 78. A finger hooking portion 51 having a stepwise shape is formed on the upper surface of the extending portion 79.

Figure 14:
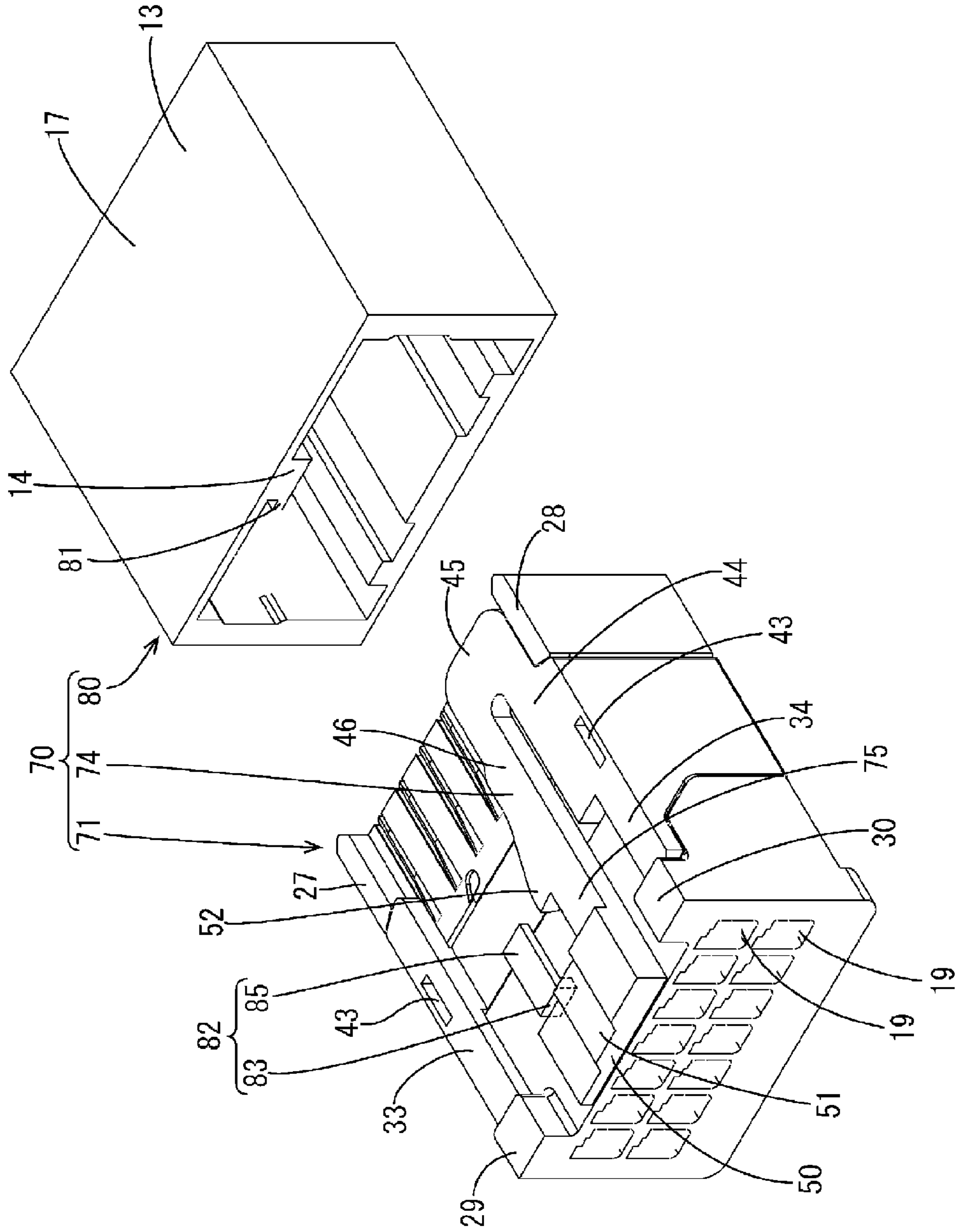
FIG. 14 is a perspective view showing the state before the male connector housing and the female connector housing are connected when viewed from a direction different from that of FIG. 13.

As shown in FIG. 14, an engaged portion 82 to be engaged with an engaging portion 81 formed in a male connector housing 80 is formed at a position in front of the extending portion 79 on the upper surface of the female connector housing 71 in a mounted state of the retainer 74.

Figure 15:
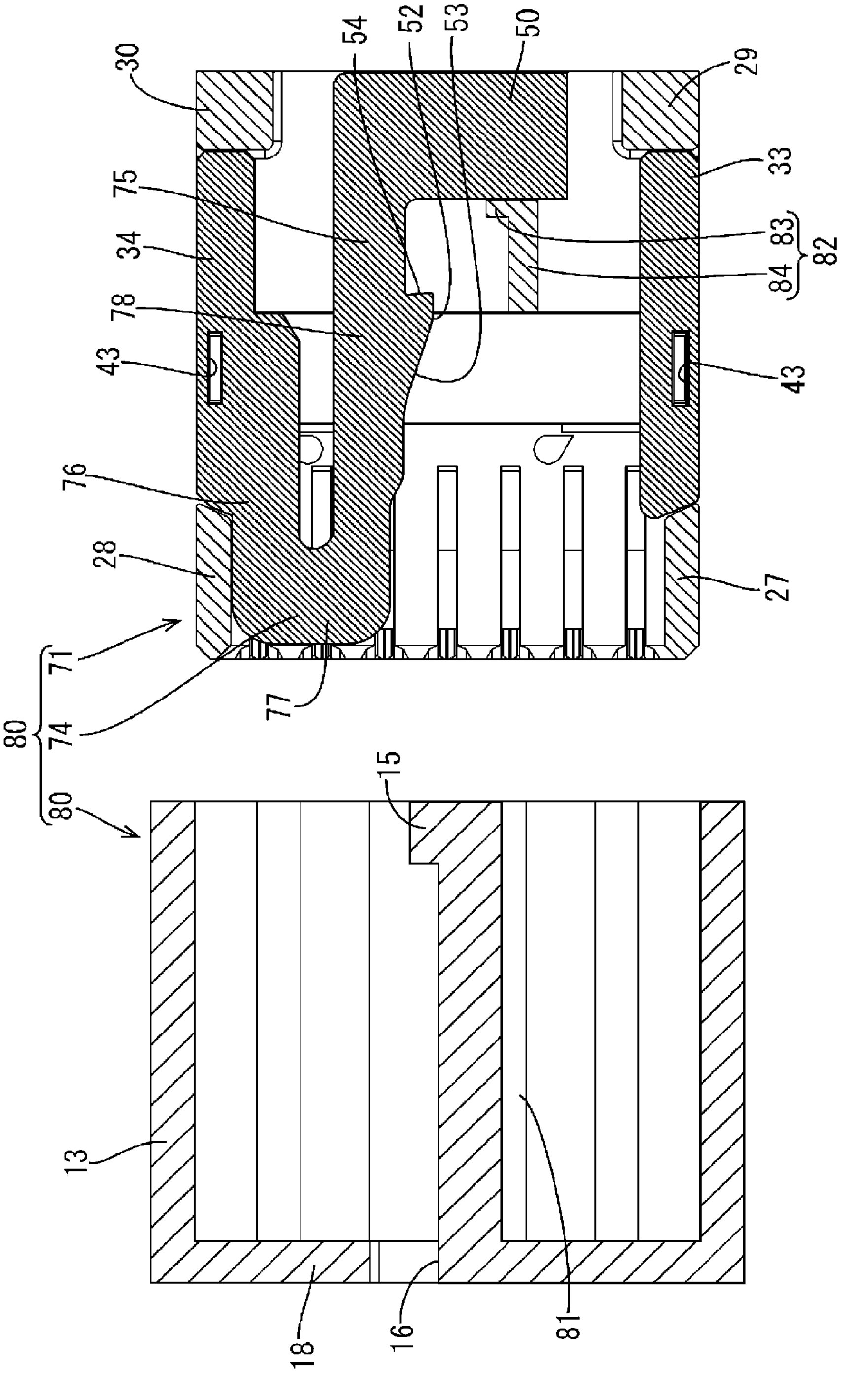
FIG. 15 is a section along IX-IX in FIG. 2 showing the state before the male connector housing and the female connector housing are connected.

As shown in FIG. 15, the engaged portion 82 includes a rear plate portion 83 formed in front of the finger hooking portion 51, projecting upward and extending in the lateral direction and a side plate portion 84 extending forward from a left end part of the rear plate portion 83. An upper end part of the rear plate portion 83 and that of the side plate portion 84 are coupled by an upper plate portion 85 (see also FIGS. 13 and 14).

As shown in FIG. 14, a rib 14 projecting downward and extending in the front-rear direction is formed at a substantially center position in the lateral direction on the lower surface of an upper wall 17 of a receptacle 13 of the male connector housing 80. As shown in FIG. 15, a lock portion 15 projecting leftward is formed on a front end part of the rib 14. A rear wall 18 of the receptacle 13 is formed with a mold removal hole 16 for forming the lock portion 15, the mold removal hole 16 penetrating through the rear wall 18 in the front-rear direction, at a position behind the lock portion 15.

As shown in FIG. 14, the engaging portion 81 projecting rightward is formed on a lower end part of the rib 14. As shown in FIG. 15, the engaging portion 81 is formed over the entire length of the rib 14 in the front-rear direction.

Figure 16:
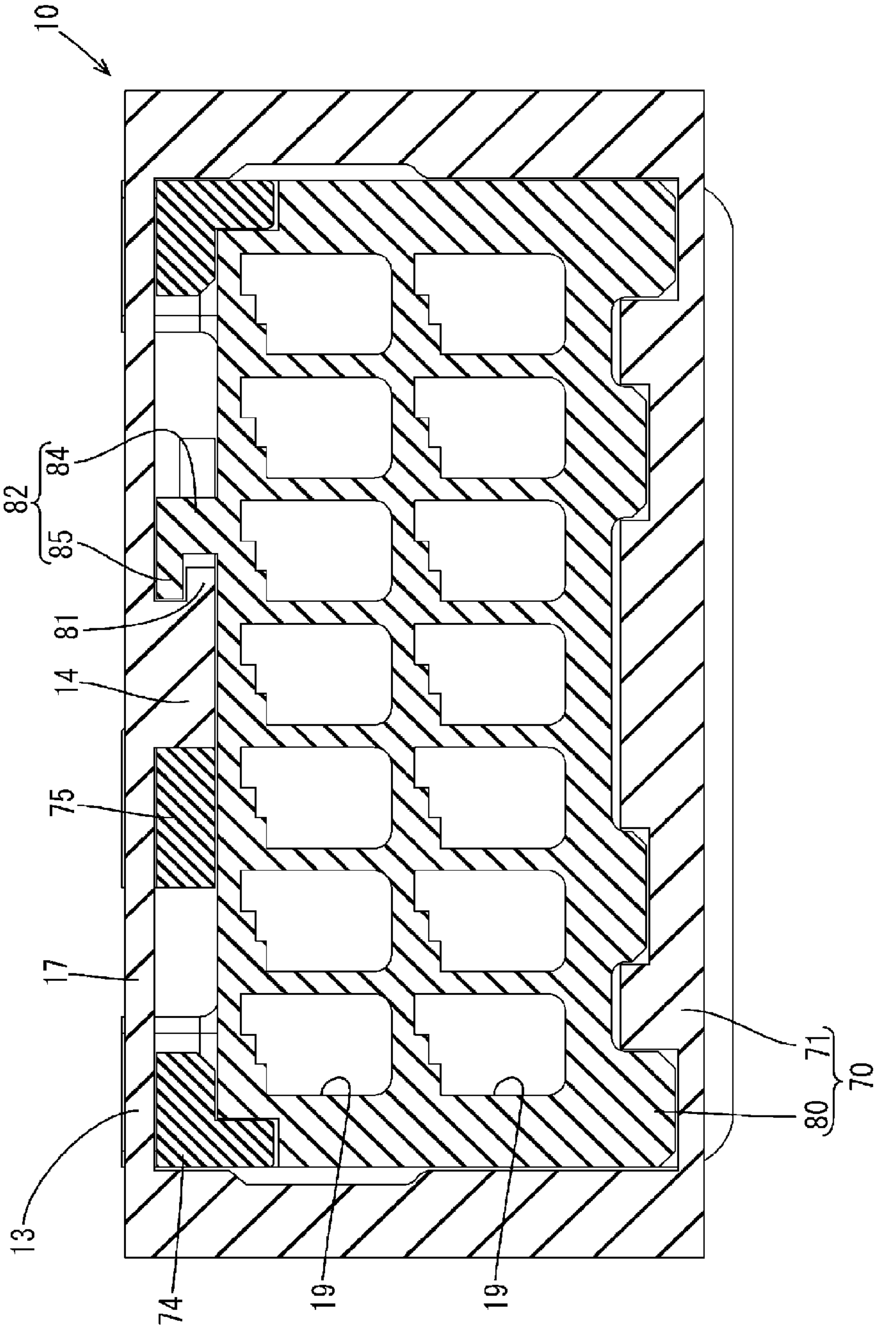
FIG. 16 is a section showing a state where an engaging portion of the male connector housing and an engaged portion of the female connector housing are engaged.

As shown in FIG. 16, with the female connector housing 71 and the male connector housing 80 connected, the upper plate portion 85 of the engaged portion 82 of the female connector housing 71 is in contact with the engaging portion 81 of the male connector housing 80 from above. In this way, it is suppressed that the receptacle 13 of the male connector housing 80 is deflected and deformed to expand upward (an example of a direction intersecting a connection direction).

Since the other configuration is substantially the same as in the first embodiment, the same members are denoted by the same reference signs and repeated description is omitted.

According to this embodiment, the resilient deforming portion 75 includes the front arm portion 76 extending forward in the connection direction, the rear arm portion 78 extending rearward in the connection direction and the coupling portion 77 coupling an end part of the front arm portion 76 and an end part of the rear arm portion 78, and the rear arm portion 78 is provided with the lock receiving portion 52 to be engaged with the lock portion 15.

By the resilient engagement of the lock portion 15 and the lock receiving portion 52, the female connector housing 71 and the male connector housing 80 are retained in the connected state.

In this embodiment, the engaging portion 81 projecting inwardly of the receptacle 13 is provided inside the receptacle 13 of the male connector housing 80, and the engaged portion 82 projecting toward the male connector housing 80 and to be engaged with the engaging portion 81 of the male connector housing 80 with the female connector housing 71 and the male connector housing 80 connected is provided on the outer surface of the female connector housing 71.

Since the engaging portion 81 of the male connector housing 80 and the engaged portion 82 of the female connector housing 71 are engaged with the female connector housing 71 and the male connector housing 80 connected, the receptacle 13 is suppressed from being deformed to expand upward.

Fourth Embodiment

Figure 17:
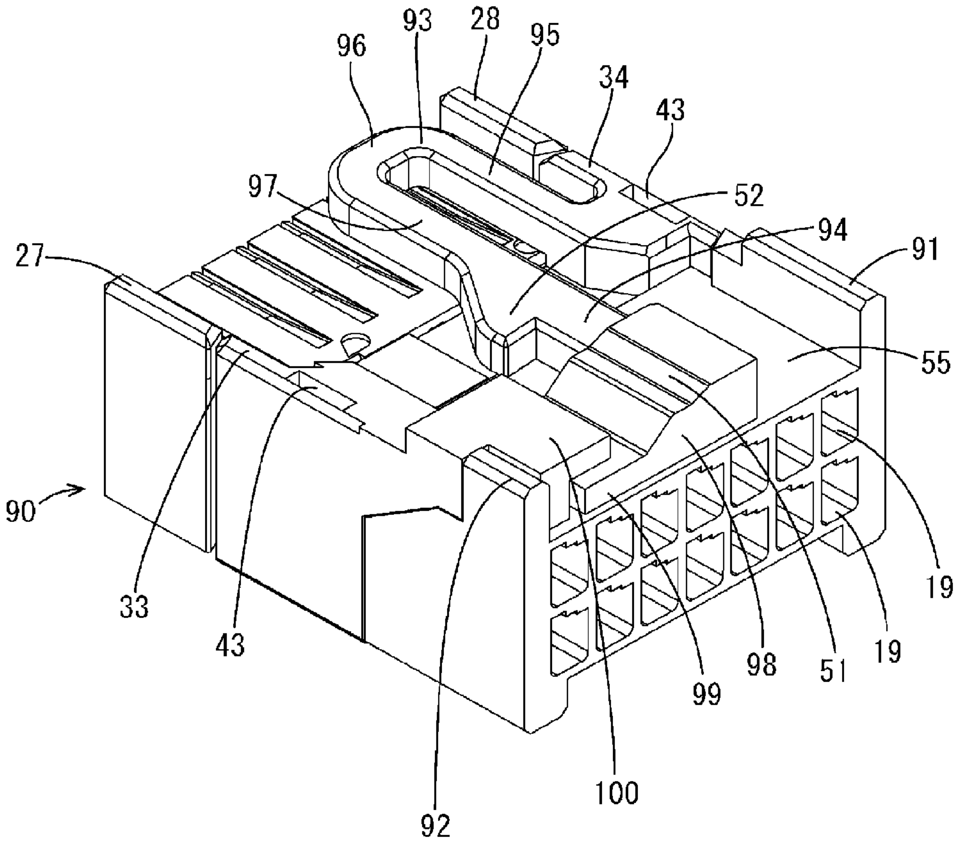
FIG. 17 is a perspective view showing a female connector housing and a retainer according to a fourth embodiment.

Next, a fourth embodiment of the present disclosure is described with reference to FIGS. 17 and 18. As shown in FIG. 17, a right-rear protrusion 91 and a left-rear protrusion 92 of a female connector housing 90 according to this embodiment are in the form of ribs elongated in the front-rear direction.

Figure 18:
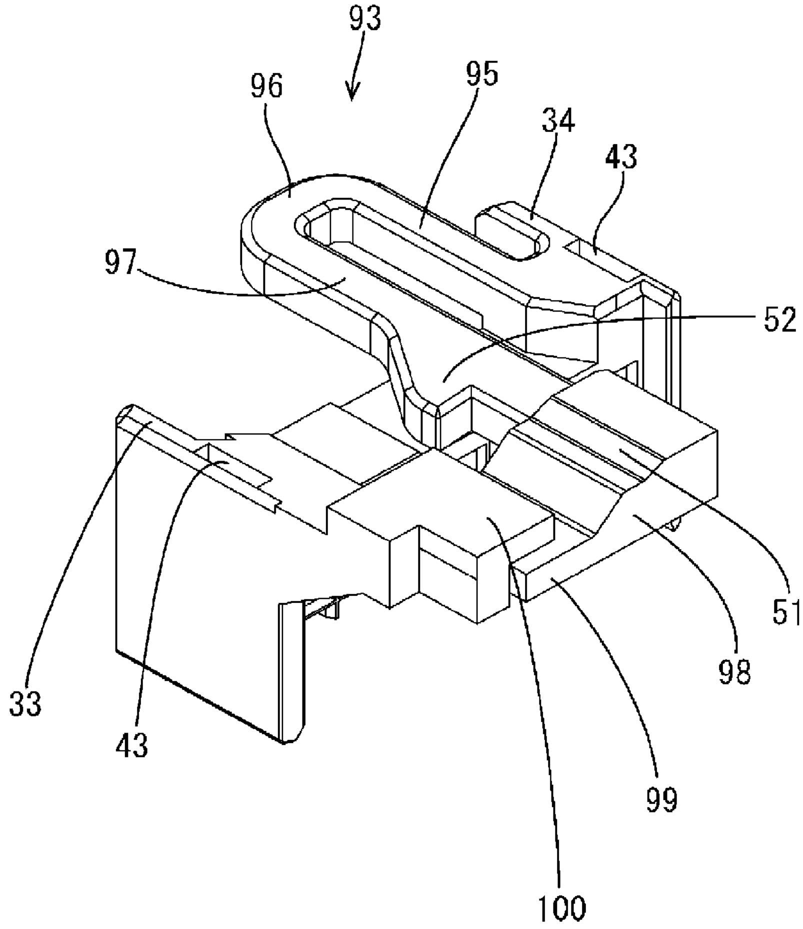
FIG. 18 is a perspective view showing the retainer.

As shown in FIG. 18, a resilient deforming portion 94 provided in a retainer 93 according to this embodiment includes a front arm portion 95 extending forward from an upper end part of a right side wall 34 of the retainer 93, a coupling portion 96 extending leftward from a front end part of the front arm portion 95 and a rear arm portion 97 extending rearward from a left end part of the coupling portion 96.

An extending portion 98 extending leftward is formed on a rear end part of the rear arm portion 97. A finger hooking portion 51 is formed on the upper surface of the extending portion 98. A locking piece 99 extending leftward is formed on a left end part of the extending portion 98. A vertical thickness of the locking piece 99 is smaller than that of the extending portion 98.

A deflection restricting portion 100 extending rearward and rightward is formed on an upper end part of a left side wall 33 of the retainer 93. The deflection restricting portion 100 is located above the locking piece 99. In this way, if an upward force is applied to the resilient deforming portion 94, the locking piece 99 is deflected upward and comes into contact with the deflection restricting portion 100 from below, whereby the resilient deforming portion 94 is suppressed from being deformed in a direction away from the upper surface of the female connector housing 71 (upward).

Since the other configuration is substantially the same as in the first embodiment, the same members are denoted by the same reference signs and repeated description is omitted.

According to this embodiment, the deflection restricting portion 100 is provided which comes into contact with the resilient deforming portion 94 when the resilient deforming portion 94 receives a force in a direction away from the outer surface of the female connector housing 71.

The deflection restricting portion 100 comes into contact with the resilient deforming portion 94 when the resilient deforming portion 94 receives the force in the direction away from the outer surface of the female connector housing 71, whereby the resilient deforming portion 94 is suppressed from being deflected in the direction away from the outer surface of the female connector housing 71.

Other Embodiments (1) The resilient deforming portion 35 may be provided in a member different from the retainer 31.

(2) The resilient deforming portion 35 may be configured to include three or more front arm portions, rear arm portions and coupling portions.

(3) The lock receiving portion 52 may be provided on the right-front arm portion 44, the left-front arm portion 47 or the left-rear arm portion 49.

(4) Although the retainer 31 is mounted into the female connector housing 11 from above, there is no limitation to this and the retainer 31 can be mounted into the female connector housing 11 from an arbitrary direction such as a leftward direction, a rightward direction or a downward direction. The resilient deforming portion 35 may be disposed on the left or right side surface of the female connector housing 11 and resiliently deformed along the side surface or may be disposed on the lower surface of the female connector housing 11 and resiliently deformed along the lower surface.

(5) Although the stress relieving portion 63 according to the second embodiment is formed by recessing the upper surface of the resilient deforming portion 35, there is no limitation to this and the stress relieving portion 63 may be formed by recessing both the upper and lower surfaces of the resilient deforming portion 35.

LIST OF REFERENCE NUMERALS

10, 60, 70: connector
11, 71, 90: female connector housing
12, 80: male connector housing
13: receptacle
14: rib
15: lock portion
16: mold removal hole
17: upper wall
18: rear wall
19: terminal accommodating portion
20: female terminal
21: locking lance
22: wire connecting portion
23: connecting tube portion
24: retainer mounting portion
25: temporary locking portion
26: complete locking portion
27: left-front protrusion
28: right-front protrusion
29: left-rear protrusion
30: right-rear protrusion
31, 61, 74, 93: retainer
32: body portion
33: left side wall
34: right side wall
35, 62, 75, 94: resilient deforming portion
36: lower wall
37: upper wall
38: left side wall
39: right side wall
40: separation wall
41: terminal contact portion
42: locking claw
43: mold removal hole
44: right-front arm portion
45: right coupling portion
46: right-rear arm portion
47: left-front arm portion
48: left coupling portion
49: left-rear arm portion
50: rear coupling portion
51: finger hooking portion
52: lock receiving portion
53: inclined surface
54: locking surface
63: stress relieving portion
64: body portion
65: projecting portion
76, 95: front arm portion
77, 96: coupling portion
78, 97: rear arm portion
79, 98: extending portion
81: engaging portion
82: engaged portion
83: rear plate portion
84: side plate portion
85: upper plate portion
91: right-rear protrusion
92: left-rear protrusion
99: locking piece
100: deflection restricting portion

What is claimed is:

1. A connector, comprising:

a first connector housing; and a second connector housing to be connected to the first connector housing along a connection direction, a retainer including a resilient deforming portion separate from the first connector housing, the resilient deforming portion being resiliently deformed along an outer surface of the first connector housing while being mounted on the first connector housing, and the second connector housing, a deflection restricting portion for coming into contact with the resilient deforming portion when the resilient deforming portion receives a force in a direction away from the outer surface of the first connector housing, and including a receptacle to be externally fit to the first connector housing and a lock portion provided inside the receptacle and to be engaged with the resilient deforming portion.

2. The connector of claim 1, wherein:

the first connector housing includes a terminal accommodating portion for accommodating a terminal and a retainer mounting portion communicating with the terminal accommodating portion, the retainer is mounted into the retainer mounting portion and engaged with the terminal while being mounted in the retainer mounting portion, and the retainer is provided with the resilient deforming portion.

3. The connector of claim 1, wherein:

the resilient deforming portion includes at least one front arm portion extending forward in the connection direction, at least one rear arm portion extending rearward in the connection direction and at least one coupling portion coupling an end part of the front arm portion and an end part of the rear arm portion, and at least one of the front arm portion and the rear arm portion is provided with a lock receiving portion to be engaged with the lock portion.

4. The connector of claim 3, wherein a stress relieving portion thinner than other parts is provided near the lock receiving portion.

5. The connector of claim 1, wherein:

an engaging portion projecting inwardly of the receptacle is provided inside the receptacle of the second connector housing, and an engaged portion projecting toward the second connector housing and to be engaged with the engaging portion of the second connector housing with the first connector housing and the second connector housing connected is provided on the outer surface of the first connector housing.

* * * * *